US006776561B1

(12) United States Patent
Yeh

(10) Patent No.: US 6,776,561 B1
(45) Date of Patent: Aug. 17, 2004

(54) MATERIALS COLLECTING APPARATUS WITH WEIGHING AND VACUUM SUCKING FUNCTIONS

(76) Inventor: Neng-Kuei Yeh, No. 10, Lane 715, Ta Tung Street, Yung Kang, Tainan Hsien (TW)

( * ) Notice: Subject to any disclaimer, the term of this patent is extended or adjusted under 35 U.S.C. 154(b) by 0 days.

(21) Appl. No.: 10/722,505

(22) Filed: Nov. 28, 2003

(51) Int. Cl.⁷ .............................................. B65G 53/66

(52) U.S. Cl. ...................... 406/33; 406/119; 406/123; 406/151; 406/156; 141/83; 141/67; 141/105

(58) Field of Search ........................... 406/33, 119, 123, 406/151, 156, 83, 67, 104, 105

(56) References Cited

U.S. PATENT DOCUMENTS

| | | | | |
|---|---|---|---|---|
| 3,077,365 A | * | 2/1963 | Chester ........................ | 406/23 |
| 3,311,418 A | * | 3/1967 | Scruby et al. ................. | 406/34 |
| 3,854,778 A | * | 12/1974 | Trythall ......................... | 406/3 |
| 4,459,028 A | * | 7/1984 | Bruder et al. ................ | 366/141 |
| 4,628,974 A | * | 12/1986 | Meyer ........................ | 141/129 |
| 4,738,289 A | * | 4/1988 | von Bennigsen-Mackiewicz et al. ............................ | 141/67 |
| 5,971,037 A | * | 10/1999 | Ansaloni ...................... | 141/83 |
| 6,273,153 B1 | * | 8/2001 | Reinsch ....................... | 141/65 |
| 6,474,372 B2 | * | 11/2002 | Sanderson et al. ............ | 141/83 |

* cited by examiner

Primary Examiner—Joe Dillon, Jr.
(74) Attorney, Agent, or Firm—Rosenberg, Klein & Lee

(57) ABSTRACT

A material collecting apparatus includes a frame with an upper supporting panel, weighing device sets hung on the panel, barrels hung on a respective weighing device set, dust collectors above a respective barrel, drawing devices connected with a respective one of the dust collectors for providing sucking force, feeding conduits connected with a respective one of the barrels, a material tank having separate compartments for containing different materials therein, and control valves each having a conduit; the feeding conduits are connected with first ends of respective plural ones of the control valve conduits while the control valve conduits are connected with a respective compartment at second ends; thus, different dry materials can be conveyed from the compartments into the barrels, and collected according to respective intended weights of the materials when the apparatus is in operation; the dust collectors prevent the materials from passing out of the barrels.

3 Claims, 5 Drawing Sheets

MATERIALS COLLECTING APPARATUS WITH WEIGHING AND VACUUM SUCKING FUNCTIONS

BACKGROUND OF THE INVENTION

1. Field of the Invention

The present invention relates to an apparatus for collecting various materials with weighing and vacuum sucking functions whose weighing devices can weigh the materials before same are put together such that the materials will be mixed together according to their respective intended weights, more particularly one, which is structured in such a way as to occupy less space.

2. Brief Description of the Prior Art

Referring to FIG. 5, a conventional apparatus for collecting various raw materials includes a main barrel 8 for a main raw material, several small barrels 81 for non-staple materials, liquid barrels 81a for liquid materials, intermediate barrels 82 disposed above the barrels 8, 81, 81a, a distributor valve 84 connected with a lower outlet of the main barrel 8 through a conduit, and several blenders 85 connected with the distributor valve 84 through respective conduits. Each of the barrels 8, 81, 81a is equipped with a weighing device 811 for measuring the weight of a respective material that is fed into it. Certain ones of the small barrels 81 are positioned such that the outlets thereof oppose the upper inlet of the main barrel 8. The barrels 8, 81 can be equipped with either funnels 821 or dust collectors 822 that have material conveying elements. The intermediate barrels 82 are connected to respective ones of the barrels 8, 81 through screw feeders 83.

In operation, different materials are manually put into those of the intermediate barrels 82 that are equipped with the funnels 821, and sucked into those of the intermediate barrels 82 that are equipped with the dust collectors 822 by means of the material conveying elements. And, the different materials are fed into respective ones of the barrels 8, 81 by means of the screw feeders 83 while liquid material is fed into the barrel 81a. The operators will weigh the materials, which are fed into the barrels 8, 81, 81a, by means of the weighing devices 811, and stop feeding the materials as soon as the materials reach respective intended weights. Thus, the different materials can be fed into the benders 85 either from the small barrels 81 or from the main barrel 8 as well as the distributor valve 84. And, the materials can be blended by the blenders, and conveyed to other machines for the next processing step.

However, the above materials collecting apparatus is found to have disadvantages as followings:

1. The apparatus occupies much space, and is relatively high (about as high as two to three floors buildings) because the intermediate barrels 82 have to be disposed above the barrels 8, 81, 81a. Consequently, it takes much space and money to build the factory building. And, there will be a lot of dust in the air, and accidents are prone to happen in feeding materials into the intermediate barrels through the funnels manually.
2. Mistakes are prone to happen, e.g. feeding materials into wrong barrels, in case materials are manually fed into the intermediate barrels through the funnels. And, many bags, which contain materials therein, are usually stacked up around the apparatus to make the factory building untidy. In addition, there will be a lot of empty bags left after the material feeding, which take much labor to handle.
3. Conveying elements and screw feeders have to be used, which are very high at the cost, and complicated in the structure. Consequently, the manufacturing cost will be high, and the products less competitive.

SUMMARY OF THE INVENTION

It is a main object of the present invention to provide a materials-collecting apparatus to overcome the above disadvantages.

The materials-collecting apparatus of the present invention includes a frame with an upper supporting panel, weighing device sets hung on the panel, barrels hung on a respective weighing device set, dust collectors located above a respective barrel, drawing devices connected to a respective dust collector with pipes for providing vacuum sucking force, feeding conduits connected with a respective one of the barrels, a material tank having separate compartments for containing different materials therein, and control valves. Each of the control valves has a conduit. The feeding conduits are connected with first ends of respective plural ones of the control valve conduits while the control valve conduits are connected with a respective compartment at second ends. Thus, different dry materials can be conveyed from the compartments into the barrels, and collected according to respective intended weights of the materials when the apparatus is in operation; the dust collectors prevent the materials from passing out of the barrels by the sucking force.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
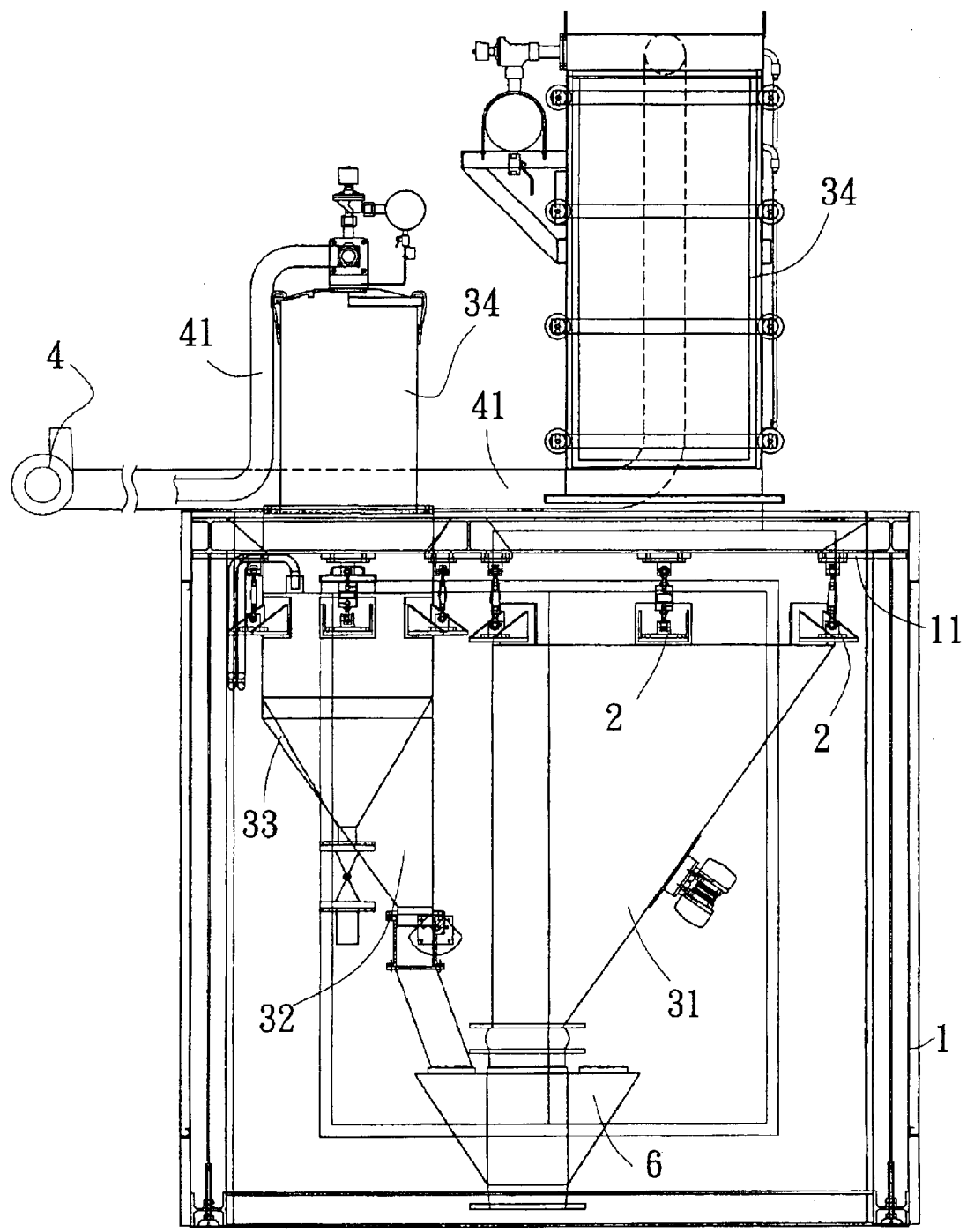
FIG. 1 is a front view of the materials-collecting apparatus according to the present invention.
Figure 2:
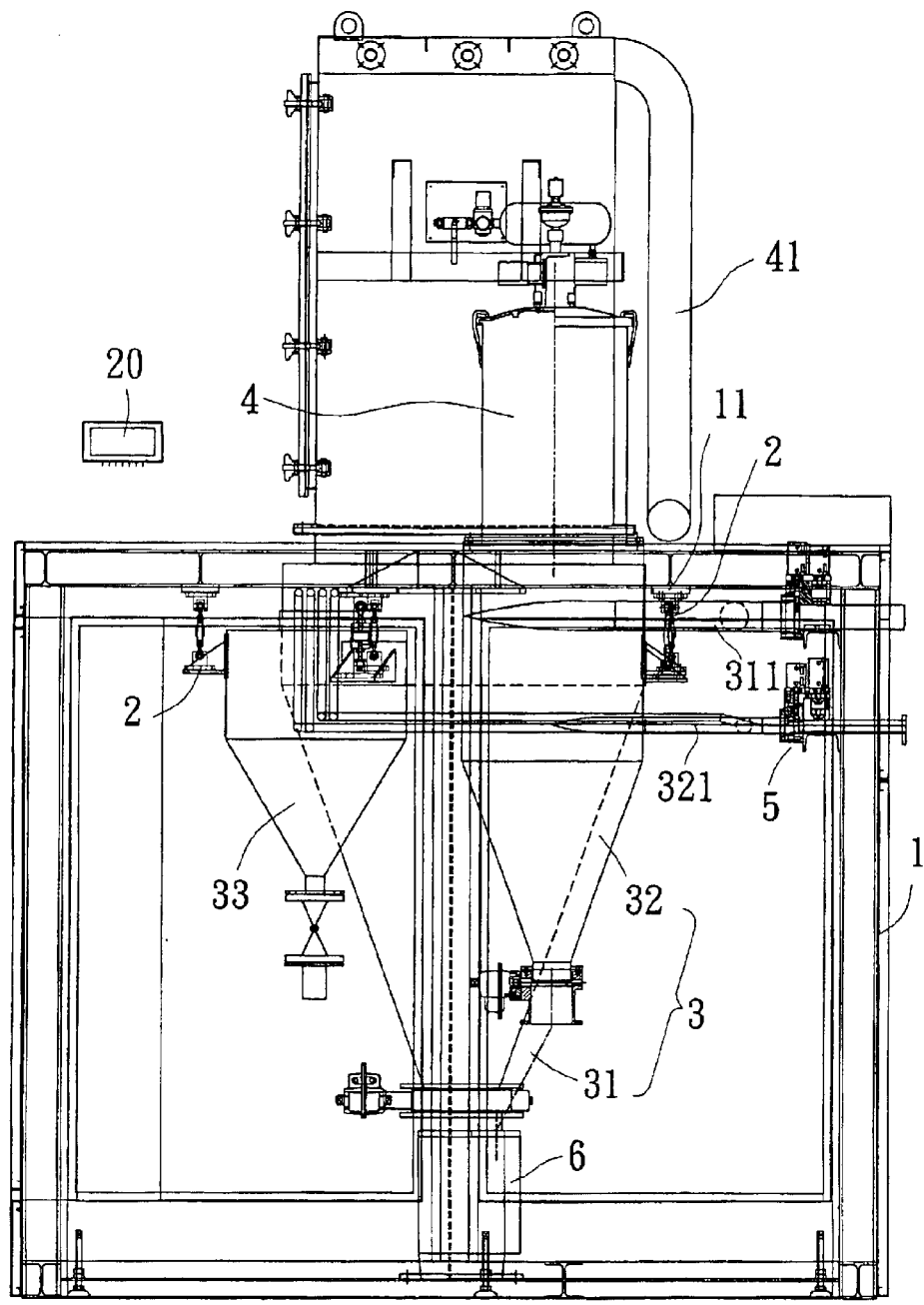
FIG. 2 is a side view of the materials-collecting apparatus according to the present invention.
Figure 3:
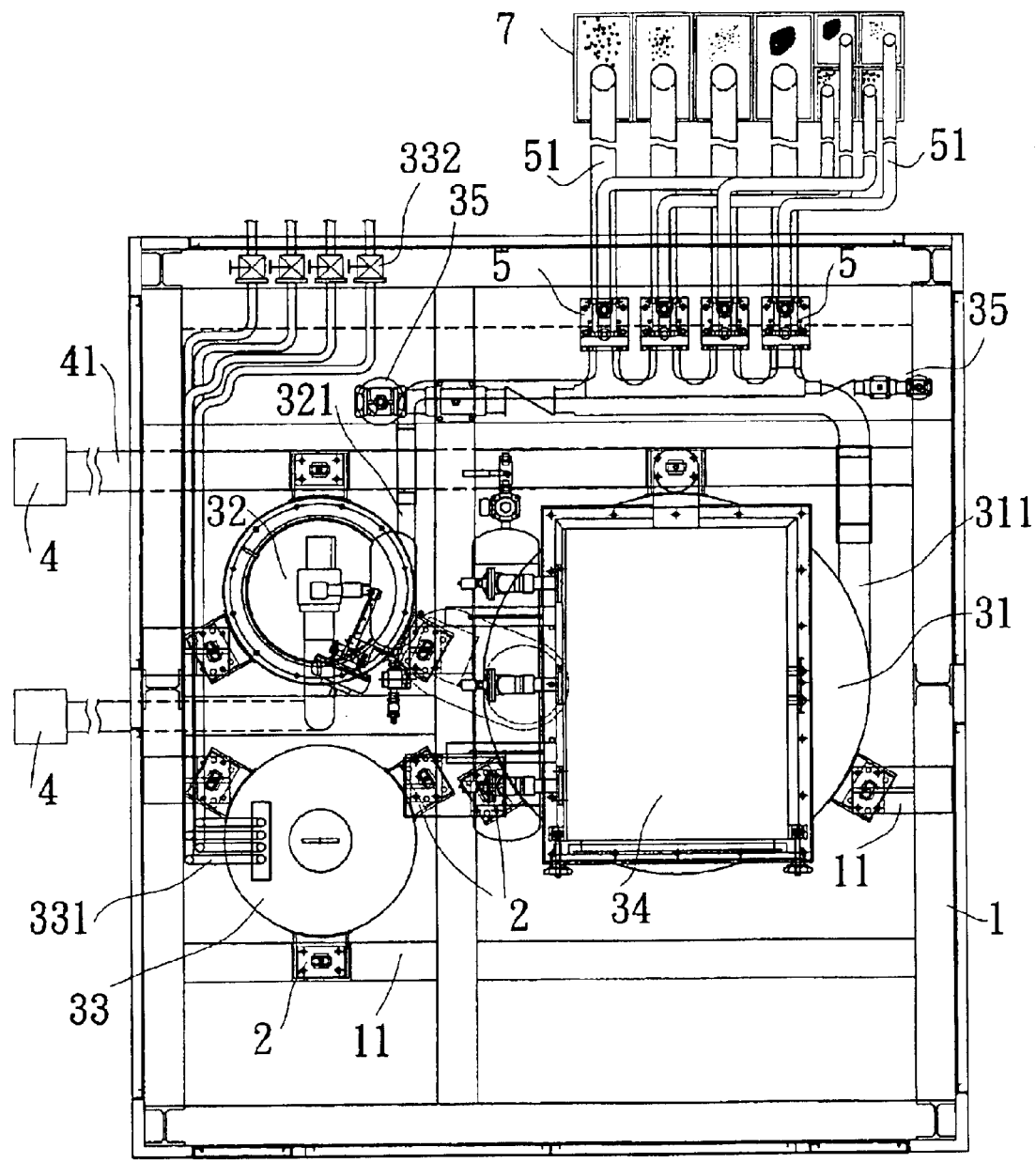
FIG. 3 is a top view of the materials-collecting apparatus according to the present invention.
Figure 4:
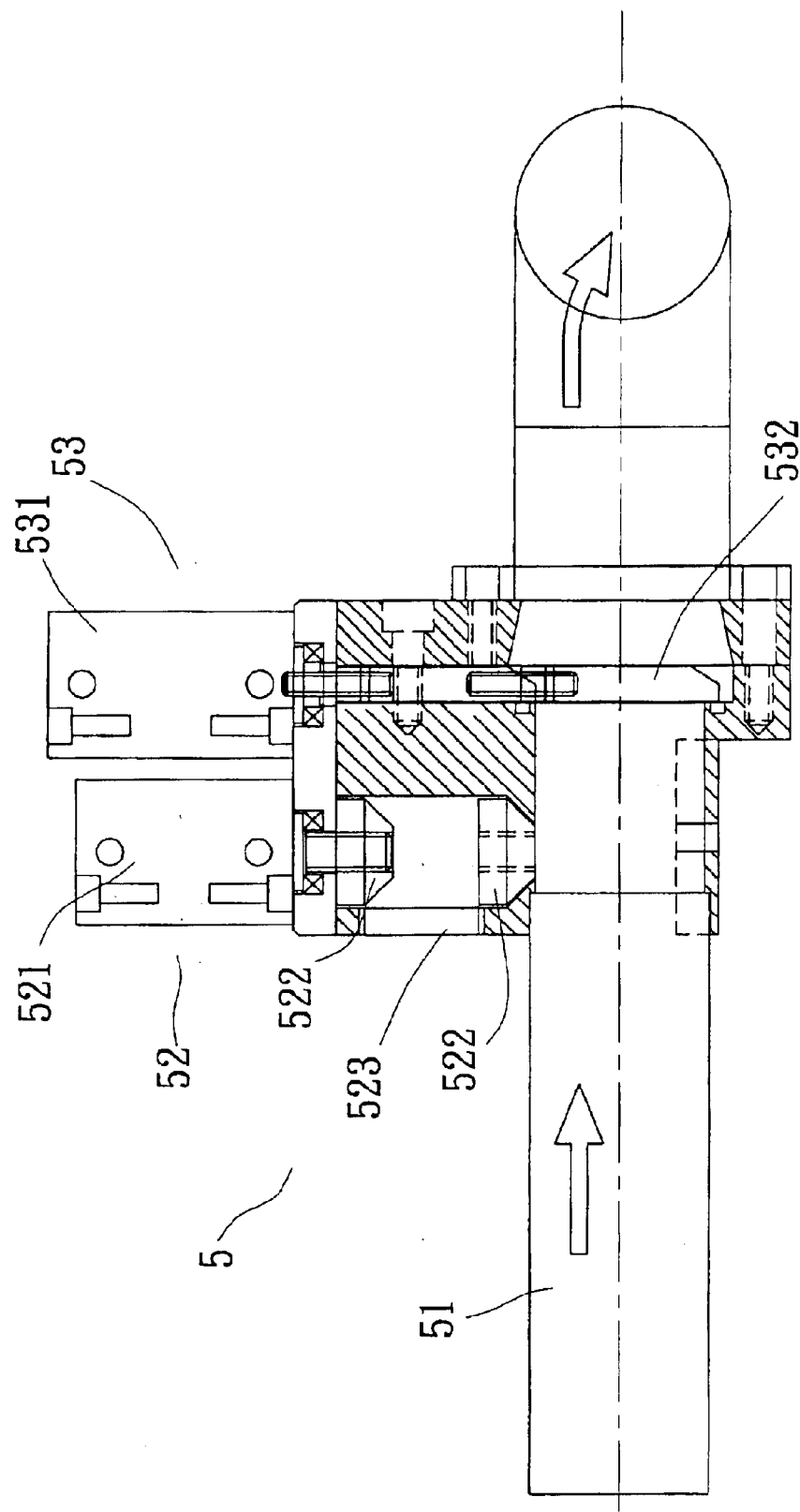
FIG. 4 is a plan of the flow control valve of the materials-collecting apparatus according to the present invention.
Figure 5:
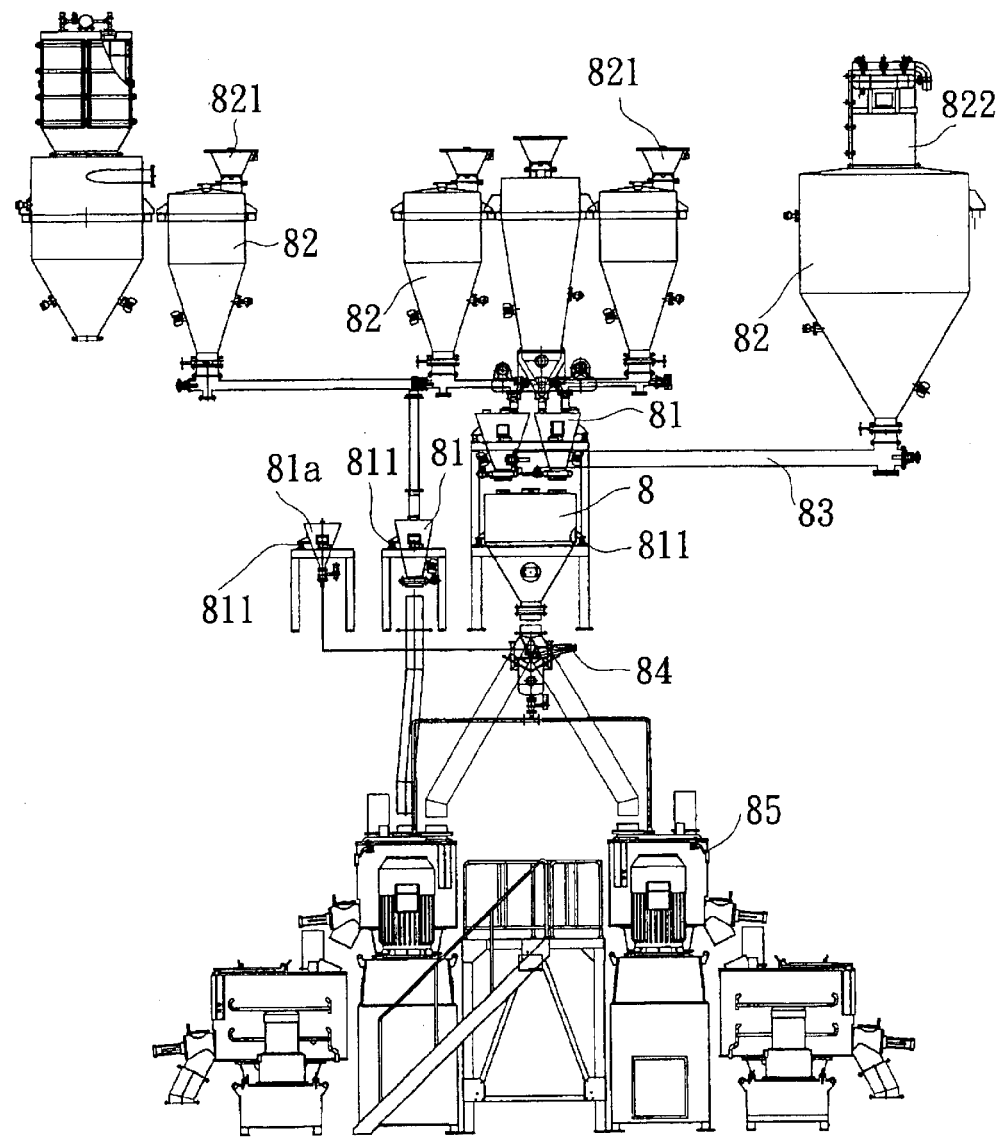
FIG. 5 is a front view of the conventional materials-collecting apparatus as described in the Background.

Referring to FIGS. 1 to 3, a preferred embodiment of a materials-feeding apparatus in the present invention includes:

a frame 1 having a supporting panel 11 at an upper end thereof;

several weighing devices 2 hung on the supporting frame 11;

two dry material barrels 3 arranged under, and connected to the weighing devices 2; the barrels 3 includes a main material barrel 31 for holding materials of larger amount therein, and a subsidiary material barrel 32 for holding materials of smaller amount therein, which barrels 31, 32 are connected to respective three weighing devices 2; material feeding conduits 311, 321 are respectively connected to the barrels 31, 32 at first ends; the conduits 311, 321 are sealed up at the other ends, and have respective airflow control valves 35, 35 fitted thereto;

a liquid barrel 33 arranged under, and connected to respective three weighing devices 2; a control valve 332 is connected to an inlet of the liquid barrel 33, and a liquid supplying conduit (not shown) for controlling flow of liquid material into the barrel 33 with;

a material tank 7 having several separate compartments for containing respective ones of different materials therein; the tank 7 can be located as far as one hundred meters away from the frame 1 or hidden under the ground so as not to occupy space in the factory;

several flow control valves 5 each having a material conduit 51; the conduits 51 are connected with a respective one of the compartments of the material tank 7 at first end thereof; referring to FIG. 4, each flow control valve 5 includes a wind adjustment unit 52, and a feeding rate adjustment unit 53, which unit 52 is comprised of a power source 521, an air inlet 523, and a plugging block 522, and which unit 53 is comprised of a power source 531, and a stopping board 532; each plugging block 522 is movable to a plugging position to block a passage between the air inlet 523 and the material conduit 51, and each stopping board 532 is movable to a blocking position for blocking a passage within the material conduit 51; the material feeding conduits 311 and 321 are connected to the other ends respective plural ones of the material conduits 51 such that passages from the material tank 7 to the barrels 31, 32 will be formed when the stopping boards 532 are moved away from the blocking position;

first and second dust collectors 34, 34 disposed on the supporting panels 11, and above respective ones of the barrels 31, 32;

first and second air drawing devices 4, 4 respectively connected to the first and the second dust collectors 34, 34 at wind outlet pipes 41 thereof to communicate with respective barrels 31, 32; thus, each of the devices 4 can form a drawing force in passages defined by the barrel 31 (32), the material feeding conduit 311 (321), and the material conduits 51 to draw the materials from the tank 7 into the barrel 31 (32) when the stopping boards 532 are moved away from the blocking position; after the drawing devices 4 draw the materials out of the tank 7, the materials will be stopped by the dust collectors 34, and fall into respective barrels 31, 32, and dust in the air will pass through the dust collectors 34 to separate from the materials;

a PLC (programmable logic controller) 20 for controlling the operation of the present apparatus; and a lower collecting container 6 connected with outlets of the barrels 31, 32, and 33.

At the beginning, the airflow control valves 35, 35 are closed, and the plugging blocks 522 and the stopping boards 532 in the blocking position. In operation, first the air drawing devices 4, 4 are activated, and the valves 35, 35 made to open by means of the PLC 20 such that air is drawn into the barrel 31 via the corresponding valve 35 and the conduit 311, and into the barrel 32 via the other valve 35 and the conduit 321, and finally into the atmosphere from the drawing devices 4, 4; when the inside pressures of the barrels 31, 32 balance, the PLC 20 takes the reading of the weighing devices 2, i.e. the weights of the barrels 31, 32 without contents, and makes the readings of the weighing devices 2 return to zero. Second, the valves 35, 35 are made to close, and the power sources 531 of the feeding rate adjustment units 53 of selected ones of the flow control valves 5 activated to move the corresponding stopping boards 532 away from the blocking position; thus, dry materials in the corresponding compartments of the tank 7 are drawn, with the dust collectors 34, 34 helping stop the materials, into the corresponding barrels 31, 32 via the material conduits 51 as well as the material feeding conduits 311, 321 while dust in the dry materials is drawn so as to pass through the dust collectors 34, 34 and discharged together with air to outside by the corresponding drawing devices 4, 4.

When the dry materials are being sucked into the barrels 31, 32, the PLC 20 takes the readings of the weighing devices 2, i.e. the net weights of the dry materials, such that it will make the stopping boards 532 move to the blocking position as soon as the dry materials in the barrels 31, 32 reach their intended weights. In addition, in light of the fact that inside pressure of the barrels 31, 32 will increase to influence the preciseness of the weighing devices 2 while materials are vacuum sucked into the barrels 31, 32, the PLC 20 will make the plugging blocks 522 of the wind adjustment units 52 of above mentioned flow control valves 5 move away from the blocking position when the difference between current weights and the intended weights of the dry materials in the barrels 31, 32 is less than a predetermined amount; thus, air is drawn into the barrels 31, 32 from the air inlets 5223 to reduce the vacuum pressure caused by the vacuum suction. Consequently, the inside pressure of the barrels 31, 32 is reduced to the initial one. And, the rates of the flows of the dry materials into the barrels 31 and 32 reduce, and in turns, the dry materials can be weighed with increased preciseness. In other words, the materials can be provided with their actual weights being virtually equal to their intended weights. The PLC 20 makes the stopping boards 532 move to the blocking position, and takes the reading of the weighing devices 2 as soon as the dry materials in the barrels 31, 32 reach their intended weights. Then, other flow control valves 5 are controlled with the PLC 20 for other dry materials, with intended weights, to be drawn into the barrels 31, 32.

The dry materials are conveyed to the lower collecting container 6 through lower ends of the barrels 31, 32. And, the PLC 20 controls the valve 332 for allowing intended weight of liquid material to be fed into the liquid barrel 33. All of the materials are blended in a blender (not shown) connected with the lower collecting container 6 so that they can be processed in the next step.

From the above description, it can be easily understood that the materials collecting apparatus of the present invention has advantages as followings:

1. Without barrels or screw feeders for respective ones of different materials, the present apparatus has lower manufacturing cost and occupies less space than the conventional one in the Background. Therefore, the present apparatus is more economical to use.

2. The tank 7 can be located as far as one hundred meters away from the frame 1 or hidden under the ground, and connected to the apparatus main body only with conduits, and there won't be any material bag stacked up around the apparatus therefore the factory building is tidy, and easy to maintain.

3. Different materials are fed to the barrels through respective conduits therefore there can't be such mistakes as the workers feeding materials into wrong barrels.

4. Because the apparatus is equipped with the flow control valves 5, vacuum pressure formed with the vacuum suction can be reduced, the rate of the flow of the materials into the barrels controlled, and different materials can be provided with their actual weights being virtually equal to their intended weights. Consequently, the final products have higher quality.

5. Because the apparatus is equipped with the programmable logic controller (PLC) 20, it can function smoothly and with precision.

What is claimed is:

1. An apparatus for collecting different materials, comprising a frame with a supporting panel on an upper side;

a plurality of weighing device sets hung on the supporting panel;

a plurality of dry material barrels hung on a respective one of the weighing device sets;

a plurality of dust collectors located above respective ones of the barrels;

a plurality of air drawing devices for providing vacuum sucking force with; each of the air drawing devices having a wind pipe; the dust collectors being connected with a respective one of the wind pipes of the air drawing devices;

material feeding conduits connected with a respective one of the barrels; each of the material feeding conduits having an airflow control valve fitted thereto;

a material tank having separate compartments for containing a respective one of different dry materials therein;

a plurality of flow control valves each having a conduit; the material feeding conduits being connected with fist ends of respective plural ones of the conduits of the flow control valves; the conduits of the flow control valves being connected with a respective one of the tank compartments at second ends thereof; each flow control valve having a wind adjustment unit including an air inlet, a power source, and a plugging block movable to a blocking position to block the air inlet; each flow control valve having a feeding rate adjustment unit including a power source, and a stopping board movable to a blocking position to block the conduit thereof;

whereby, in operation, allowing different dry materials to be conveyed from the tank compartments into the barrels, and collected according to respective intended weights of the materials.

2. The apparatus for collecting different materials, as claimed in claim 1, wherein the barrels are grouped into main ones, and subsidiary ones according to amount of materials that are intended to fed into the barrels.

3. The apparatus for collecting different materials as claimed in claim 1, wherein a liquid barrel is hung on a respective weighing device set while a control valve is connected to an inlet of the liquid barrel as well as a liquid supplying conduit for controlling flow of liquid material into the liquid barrel with.

\* \* \* \* \*